(12) United States Patent
Perotti

(10) Patent No.: US 11,056,117 B2
(45) Date of Patent: Jul. 6, 2021

(54) ENHANCED VOICEPRINT AUTHENTICATION

(71) Applicant: Plantronics, Inc., Santa Cruz, CA (US)

(72) Inventor: Erik Keil Perotti, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 71 days.

(21) Appl. No.: 16/460,418

(22) Filed: Jul. 2, 2019

(65) Prior Publication Data
US 2019/0325878 A1    Oct. 24, 2019

Related U.S. Application Data

(63) Continuation of application No. 15/439,588, filed on Feb. 22, 2017, now Pat. No. 10,360,916.

(51) Int. Cl.
*G10L 15/22* (2006.01)
*G10L 17/08* (2013.01)
*G10L 17/22* (2013.01)
*G10L 17/24* (2013.01)
*G10L 17/00* (2013.01)

(52) U.S. Cl.
CPC .............. *G10L 17/08* (2013.01); *G10L 15/22* (2013.01); *G10L 17/22* (2013.01); *G10L 17/00* (2013.01); *G10L 17/24* (2013.01); *G10L 2015/223* (2013.01)

(58) Field of Classification Search
CPC ............... G10L 15/22; G10L 2015/223; G10L 2015/227; G10L 2015/228; G10L 15/26; G10L 15/30; G10L 17/00; G10L 17/08; G10L 17/10; G10L 17/22; G10L 17/24; G06F 3/167; G06F 21/32; G06F 21/31; G06F 3/01; G06F 3/385

USPC .... 704/249, 251, 246, 257, 270, 270.1, 235, 704/275, 9; 379/88.02–88.04, 88.19, 379/88.21, 93.03
See application file for complete search history.

(56) References Cited

U.S. PATENT DOCUMENTS

| | | |
|---|---|---|
| 7,054,811 B2 | 5/2006 | Barzilay |
| 7,136,684 B2 | 11/2006 | Matsuura et al. |
| 7,177,309 B2 | 2/2007 | Shinohara |
| 7,447,632 B2 | 11/2008 | Itou |

(Continued)

OTHER PUBLICATIONS

Miller, "Sensory Adds Speaker ID to Wake-up Words," May 2, 2012, 3 pages, found at URL <http://opusresearch.net/wordpress/2012/05/02/sensory-adds-speaker-id-to-wake-up-words/>.

(Continued)

*Primary Examiner* — Vijay B Chawan
(74) *Attorney, Agent, or Firm* — Ferguson Braswell Fraser Kubasta PC

(57) ABSTRACT

The invention relates to a method for enhanced voiceprint authentication. The method includes receiving an utterance from a user, and determining that a portion of the utterance matches a pre-determined keyword. Also, the method includes authenticating the user by comparing the portion of the utterance with a voiceprint that is associated with the pre-determined keyword. Further, the method includes identifying a resource associated with the pre-determined keyword while comparing the portion of the utterance with the voiceprint. Still yet, the method includes accessing the resource in response to authenticating the user based on the comparison.

18 Claims, 6 Drawing Sheets

(56) References Cited

U.S. PATENT DOCUMENTS

| | | | |
|---|---|---|---|
| 7,693,720 B2* | 4/2010 | Kennewick | G06F 16/3329 704/275 |
| 7,949,529 B2* | 5/2011 | Weider | G10L 15/1815 704/270 |
| 8,117,035 B2 | 2/2012 | Runge et al. | |
| 8,195,468 B2* | 6/2012 | Weider | G06F 16/951 704/275 |
| 8,457,974 B2 | 6/2013 | Wang | |
| 8,615,395 B2 | 12/2013 | Tomono et al. | |
| 8,682,667 B2 | 3/2014 | Haughay | |
| 8,886,545 B2* | 11/2014 | Meisel | G06F 3/167 704/275 |
| 9,008,284 B2 | 4/2015 | Morganstein et al. | |
| 9,401,058 B2 | 7/2016 | De La Fuente et al. | |
| 9,495,956 B2* | 11/2016 | Meisel | G10L 15/08 |
| 9,619,572 B2* | 4/2017 | Phillips | G10L 25/48 |
| 9,633,655 B1 | 4/2017 | Santos et al. | |
| 9,646,610 B2 | 5/2017 | Macho | |
| 9,697,822 B1* | 7/2017 | Naik | G10L 15/22 |
| 9,767,805 B2 | 9/2017 | Dai et al. | |
| 9,792,913 B2 | 10/2017 | Li et al. | |
| 9,804,820 B2 | 10/2017 | Quast et al. | |
| 9,807,611 B2 | 10/2017 | Takenouchi | |
| 9,921,559 B2 | 3/2018 | Tsubota | |
| 10,049,675 B2* | 8/2018 | Haughay | G10L 17/00 |
| 2006/0020460 A1 | 1/2006 | Itou | |
| 2006/0287014 A1 | 12/2006 | Matsuura et al. | |
| 2011/0066634 A1* | 3/2011 | Phillips | G10L 15/22 707/769 |
| 2011/0208524 A1 | 8/2011 | Haughay | |
| 2011/0231182 A1* | 9/2011 | Weider | G06F 16/951 704/9 |
| 2014/0122087 A1 | 5/2014 | Macho | |
| 2014/0188471 A1* | 7/2014 | Haughay | G06F 3/167 704/246 |
| 2014/0244273 A1* | 8/2014 | Laroche | G06F 1/3206 704/275 |
| 2014/0303966 A1 | 10/2014 | Adachi et al. | |
| 2014/0365222 A1* | 12/2014 | Weider | G10L 15/22 704/257 |
| 2015/0073802 A1* | 3/2015 | Meisel | G10L 15/08 704/251 |
| 2015/0332369 A1 | 11/2015 | Nakane | |
| 2015/0340025 A1 | 11/2015 | Shima | |
| 2016/0071521 A1 | 3/2016 | Haughay | |
| 2016/0330601 A1 | 11/2016 | Srivastava | |
| 2017/0017501 A1 | 1/2017 | Quast | |
| 2017/0316782 A1* | 11/2017 | Haughay | G06F 3/167 |
| 2018/0293221 A1* | 10/2018 | Finkelstein | G06F 40/205 |

OTHER PUBLICATIONS

Unknown, "Nuance Unlocks Personalized Content for Smart TVs with Voice Biometrics for Dragon TV," Jan. 7, 2014, 2 pages, found at URL <http://www.nuance.com/company/news-room/press-releases/DragonTV_Voice_Biometrics.docx>.

Unknown, "Sensory Introduces Speaker Verification for Mobile Phones," May 2, 2012, 3 pages, found at URL <http://www.marketwired.com/press-release/sensory-introduces-speaker-verification-for-mobile-phones-1651774.htm>.

\* cited by examiner

ENHANCED VOICEPRINT AUTHENTICATION

CROSS-REFERENCE TO RELATED APPLICATIONS

The present application is a continuation application relating to and claiming the benefit of U.S. patent application Ser. No. 15/439,588, titled "Enhanced Voiceprint Authentication", having a filing date of Feb. 22, 2017. The contents of the aforesaid application are incorporated herein by reference.

FIELD

The present disclosure relates generally to the field of biometric security. More particularly, the present disclosure relates to voice authentication by a biometric security system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Millions of wireless headsets have been sold around the world. These headsets pair with a host device, such as a computer, smartphone, or tablet, to enable untethered, hands-free communication. By way of such a headset, a wearing user can issue verbal commands that control a paired host device beyond basic telephony capabilities. For example, by way of verbal commands to a headset, a user may be able to unlock a host device, or access data stored within the host device. As headsets have been given greater and greater access to the data stored on host devices, security has become an increasing concern. As a result, some wireless headsets include a voice authentication feature that serves to preclude an unauthenticated user from accessing the contents of a paired host device. Unfortunately, voice authentication mechanisms are considered to be inherently weaker than alternative biometric authentication mechanisms, such as retinal scanners and fingerprint sensors. In particular, the current generation of voice authentication mechanisms suffer from a greater false acceptance rate (FAR) and false rejection rate (FRR) than these alternative authentication mechanisms. The FAR is the percentage of access attempts by unauthorized users that are incorrectly authenticated as valid by a biometric security system, and the FRR is the percentage of access attempts by authorized users that are incorrectly rejected by a biometric security system.

SUMMARY

In general, in one aspect, the invention relates to a method for enhanced voiceprint authentication. The method includes receiving a first utterance from a user, and determining that at least a portion of the first utterance matches a first pre-determined keyword. Also, the method includes authenticating the user by comparing the at least a portion of the first utterance with a first voiceprint that is associated with the first pre-determined keyword. Further, the method includes identifying a first resource associated with the first pre-determined keyword while comparing the at least a portion of the first utterance with the first voiceprint. Still yet, the method includes accessing the first resource in response to authenticating the user based on the comparison.

In general, in one aspect, the invention relates to a headset for enhanced voiceprint authentication. The headset includes a microphone, a speaker, a processor, and memory coupled to the processor. The memory stores a first voiceprint, a first pre-determined keyword in association with the first voiceprint, and instructions. The instructions, when executed by the processor cause the processor to perform a method that includes receiving, via the microphone, a first utterance from a user, and determining that at least a portion of the first utterance matches the first pre-determined keyword. The method performed by the processor also includes authenticating the user by comparing the at least a portion of the first utterance with the first voiceprint, and, while comparing the at least a portion of the first utterance with the first voiceprint, identifying a first resource associated with the first pre-determined keyword. Further, the method performed by the processor includes accessing the first resource in response to authenticating the user based on the comparison.

In general, in one aspect, the invention relates to a method for enhanced voiceprint authentication. The method includes receiving a first utterance from a user, and determining that at least a portion of the first utterance matches a first pre-determined keyword. Also, the method includes authenticating the user by comparing the at least a portion of the first utterance with a first voiceprint that is associated with the first pre-determined keyword. Further, the method includes identifying a first resource associated with the first pre-determined keyword, and, in response to authenticating the user based on the comparison of the at least a portion of the first utterance and the first voiceprint, accessing the first resource. Still yet, the method includes receiving a second utterance from the user, and determining that at least a portion of the second utterance matches a second pre-determined keyword. Also, the method includes authenticating the user by comparing the at least a portion of the second utterance with a second voiceprint that is associated with the second pre-determined keyword, and identifying a second resource associated with the second pre-determined keyword. Additionally, the method includes accessing the second resource in response to authenticating the user based on the comparison of the at least a portion of the second utterance and the second voiceprint.

The details of one or more implementations are set forth in the accompanying drawings and the description below. Other features will be apparent from the description and drawings, and from the claims.

DETAILED DESCRIPTION

Figure 1A:
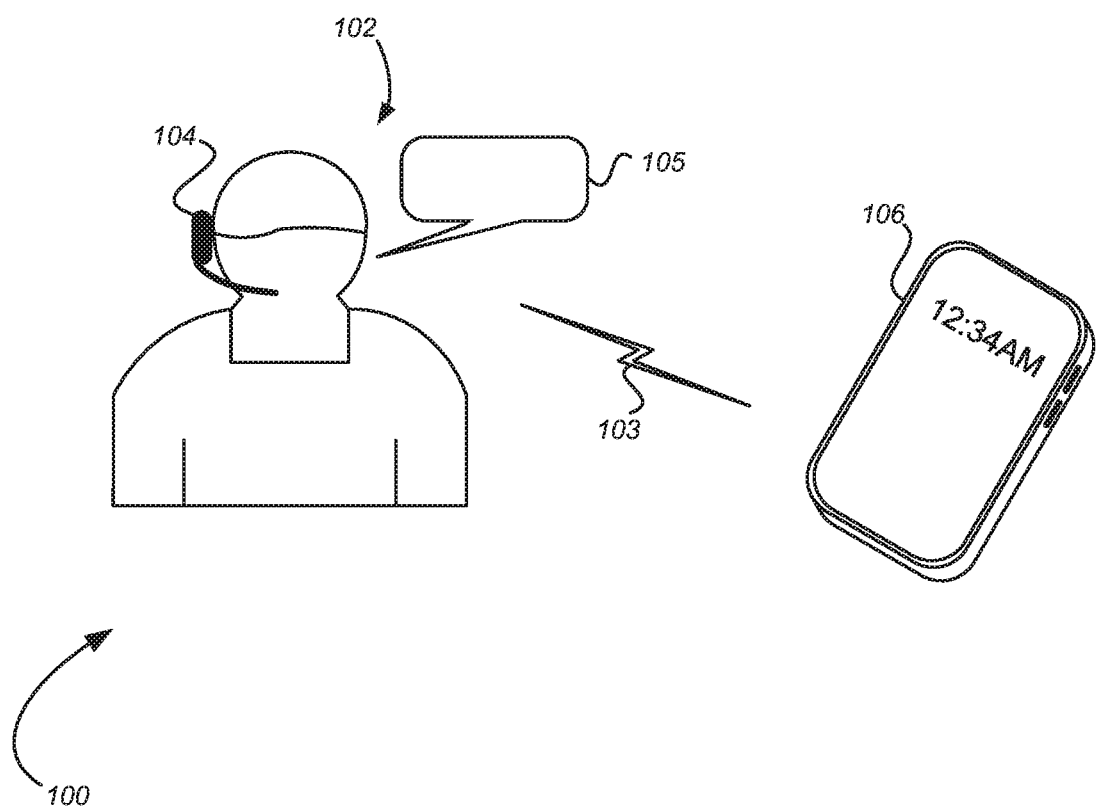
FIGS. 1A, 1B, and 1C depict a system for enhanced voiceprint authentication, in accordance with one or more embodiments of the invention.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named the elements. For example, a first element is distinct from a second element, and the first element may encompass more than one element and succeed (or precede) the second element in an ordering of elements.

As individuals further integrate technology into their personal and business activities, devices such as personal computers, tablet computers, mobile phones (e.g., smartphones, etc.), and other wearable devices contain an increasing amount of sensitive data. This sensitive data may include personal information, or proprietary business information. Many individuals rely on hands-free devices, such as headsets, to make phone calls, and interact with their other devices using voice commands. As headset usage increases, headsets are well postured to assume the role of security tokens. In particular, the information gathered by the sensors in a headset may be used to confirm the identify of a wearing user, and better control or manage access to the sensitive data on a host device.

Unfortunately, the primary biometric access control mechanism of headset devices is voiceprint matching using an enrolled fixed trigger or a user-defined trigger. A fixed trigger may be a predetermined phrase selected by, for example, a headset manufacturer that has been selected for its linguistic structure or contents, such as phonemes. A user-defined trigger may be any phrase that a user determines should be his or her phrase that controls access to his or her headset. In either case, a user records his or her voice, using, for example, a client application. The recording is analyzed to identify characteristics of the voice recording, resulting in a file that can be stored to a headset as a baseline for analysis and comparison, by the headset, at a later time. Subsequently, when the user attempts to utilize the headset, the user's identity may be validated by prompting the user to repeat the trigger. Accordingly, the confidence in a user's identity, and thereby data security, may be increased by requiring a wearing user to say longer and more complex trigger phrases, which increase the subsequent exposure and analysis time. However, such mechanisms often frustrate the user by delaying the user's access to his or her data. Moreover, such mechanisms decrease battery life. Currently, a headset manufacturer will tune its device to balance user experience, battery life, accuracy, and security. Consequently, a device's security may be compromised by the otherwise meritorious goals of increased battery life, better user experience, and increased accuracy.

In general, embodiments of the invention provide a system, a method, and a computer readable medium for overloading the voice commands of a headset such that each voice command not only results in the execution of a particular function, but additionally acts as an enrolled fixed trigger. The voice commands may include, for example, a keyword spotter or wakeup word. Accordingly, whenever a user wearing the headset utters a known command, the exposure to that utterance is leveraged to confirm, or further confirm, the user's identity, in addition to causing the performance of the specific functionality that the user has requested. Accordingly, by more frequently relying on shorter fixed triggers for identity validation purposes, not only do embodiments of the invention provide for greater security, but user experience, battery life, and accuracy may all be improved.

FIG. 1A shows a system 100 for enhanced voiceprint authentication, according to one or more embodiments. As illustrated in FIG. 1A, the system 100 includes a host device 106 in communication, via a wireless link 103, with a headset 104. Also, as shown in FIG. 1A, the headset 104 is being worn by a user 102. As described herein, the user 102 includes a person. The headset 104 may include any body-worn device with a speaker proximate to an ear of the user 102, and a microphone for monitoring the speech of the user 102. Accordingly, the headset 104 may include a monaural headphone or stereo headphones, whether worn by the user 102 over-the-ear (e.g., circumaural headphones, etc.), in-ear (e.g., earbuds, earphones, etc.), or on-ear (e.g., supraaural headphones, etc.).

As described herein, the host device 106 includes any computing device capable of storing and processing digital information on behalf of the user 102. In one or more embodiments, and as depicted in FIG. 1A, the host device 106 comprises a cellular phone (e.g., smartphone) of the user 102. However, for reasons that will become clear upon reading the present disclosure, it is understood that the host device 106 may comprise a desktop computer, laptop computer, tablet computer, or other computing device of the user 102. In one or more embodiments, the host device 106 is communicatively coupled with a network. The network may be a communications network, including a public switched telephone network (PSTN), a cellular network, an integrated services digital network (ISDN), a local area network (LAN), and/or a wireless local area network (WLAN), that support standards such as Ethernet, wireless fidelity (Wi-Fi), and/or voice over internet protocol (VoIP).

As shown in FIG. 1A, the headset 104 and the host device 106 communicate over a wireless link 103. The wireless link 103 may include, for example, a Bluetooth link, a Digital Enhanced Cordless Telecommunications (DECT) link, a cellular link, a Wi-Fi link, etc. In one or more embodiments, via the wireless link 103, the host device 106 may exchange audio, status messages, command messages, data, etc., with the headset 104. For example, the headset 104 may be utilized by the user 102 to listen to audio (e.g., music, voicemails, telephone calls, text-to-speech emails, text-to-speech text messages, etc.) originating at the host device 106. Further, the headset 104 may send commands to the host device 106, that result in, for example, the unlocking of the host device 106, the opening of an application on the host device 106, the retrieval of data by the host device 106, or the authentication of the user 102 at the host device 106.

As shown in FIG. 1A, the user 102 has spoken out loud an utterance 105, which is picked up by a microphone of the headset 104. The utterance 105 may include a command, such as a wakeup word or challenge passphrase. In some prior art headsets, a wakeup word is used to activate the headsets. Prior to detecting the wakeup word, such prior art headsets are not actively analyzing a content of the utterances of the user 102 in order to validate the identity of the user 102. Such headsets may, in response to identifying the occurrence of a wakeup word in the speech of the user 102, begin monitoring for another keyword or key phrase, also known as a voice command. In some prior art headsets, a specific key phrase may be used to verify a user's identity (i.e., a challenge passphrase, etc.). In some prior art headsets, the challenge passphrase is requested from the user immediately after detecting the wakeup word, or upon the occurrence of another event. For example, in response to the user 102 saying the phrase "challenge me," or interacting with an application on a host device, such headsets may initiate a biometric verification process. The biometric verification process may rely on a comparison of a subsequently spoken passphrase (by the user 102), with a previously stored model of the passphrase, to verify that the user 102 is an authorized user. The passphrase may include any sequence of words, and may be selected for its content of phonemes, voice differentiators, or other properties that may increase confidence in biometric authentication. Accordingly, the passphrase may offer no further functionality than user verification.

Thus, these prior art headsets are limited in two respects. First, the reliance on a single, specific passphrase limits a prior art headset's exposure to, and therefore analysis of, a user's voice. As a result, prior art headsets may experience an unacceptable FAR and/or FRR. Problematically, after authenticating a user using a specific passphrase, an unauthenticated user may begin speaking voice commands to a prior art headset, resulting in undesirable access to the contents of the headset and possibly a paired host device. Second, because a wearing user may need to specifically initiate such prior art headsets using a wakeup word, the user often feels as though such interactions are inefficient. For example, a user of a prior art headset may first need to speak a wakeup word, speak a command that initiates user verification, and then speak a particular passphrase. Only after this sequence of events completes successfully, will a prior art headset respond to other commands spoken by the user. Not only is this a time consuming process—especially if the user is simply seeking to obtain basic information from the headset or a host device—but the occurrence of a false rejection requires that the user perform this process multiple times.

The embodiments described herein provide for increased device security, while also improving user experience, battery life, and accuracy. For example, referring back to FIG. 1A, in response to a content of the utterance 105, the headset 104 may validate an identify of the user 102, and also present the user 102 with access to a resource on the headset 104 or a resource on the host device 106. In other words, the headset 104 may include multiple overloaded keywords that are not only linked to a functional resource, but also enable the biometric verification of the identity of the user 102. By overloading the keywords of the headset 104, the headset 102 may verify the identity of the user 102 with every command in a sequence of commands received from the user 102. Due to the continuous and recurring authentication of the user 102, the headset 104 can maintain a greater confidence in the identity of the user 102. In this way, the security of the headset 104 may be dramatically improved, and the headset 104 may become a token that can reliably confirm the identity of the user 102.

Figure 1C:
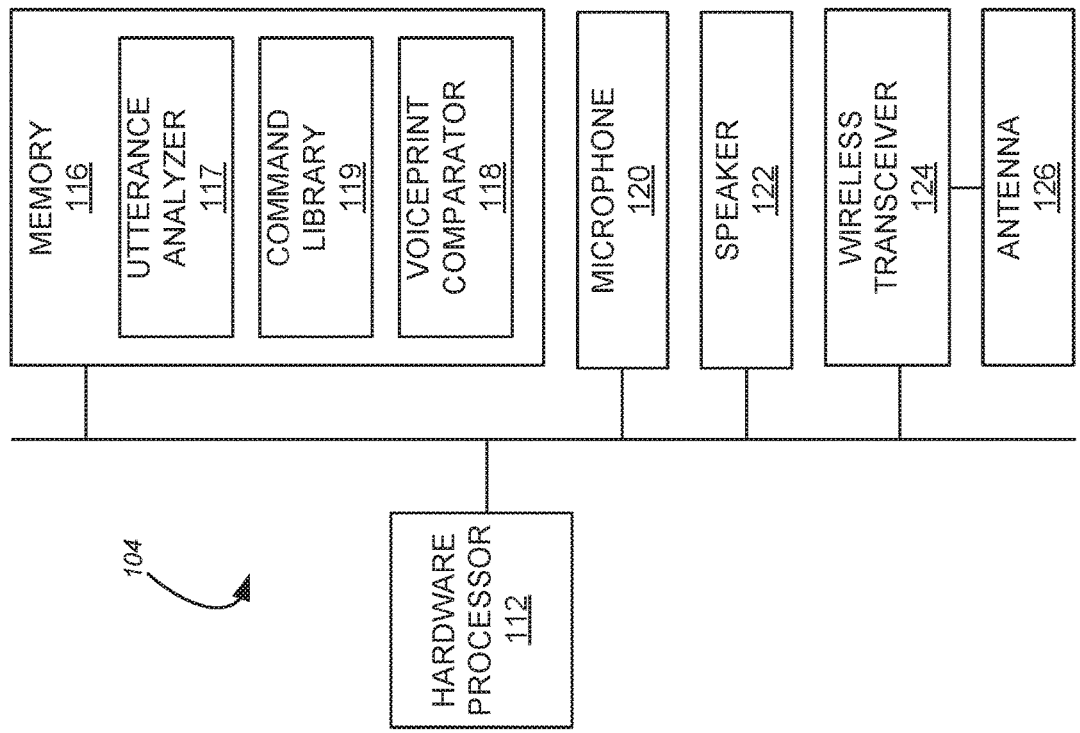
Figure 1B:
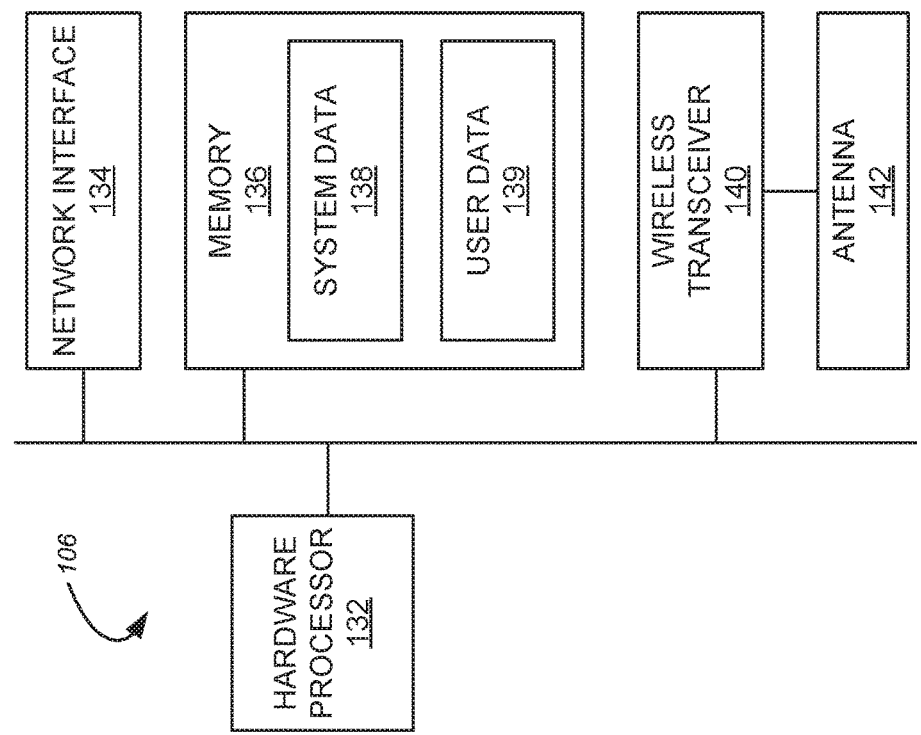

FIG. 1B depicts a block diagram of the host device 106, according to one or more embodiments. Although the elements of the host device 106 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1B may be omitted, repeated, and/or substituted. Accordingly, various embodiments may lack one or more of the features shown. For this reason, embodiments of the invention should not be considered limited to the specific arrangements of elements shown in FIG. 1B.

As shown in FIG. 1B, the host device 106 includes a hardware processor 132 operably coupled to a memory 136, a wireless transceiver 140 and accompanying antenna 142, and a network interface 134. In one or more embodiments, the hardware processor 132, the memory 136, the wireless transceiver 140, and the network interface 134 may remain in communication over one or more communication busses. Although not depicted in FIG. 1B for purposes of simplicity and clarity, it is understood that, in one or more embodiments, the host device 106 may include one or more of a display, a haptic device, and a user-operable control (e.g., a button, slide switch, capacitive sensor, touch screen, etc.).

As described herein, the hardware processor 132 processes data, including the execution of applications stored in the memory 136. In one or more embodiments, the hardware processor 132 may include a variety of processors (e.g., digital signal processors, etc.), analog-to-digital converters, digital-to-analog converters, etc., with conventional CPUs being applicable.

The host device 106 utilizes the wireless transceiver 140 for transmitting and receiving information over a wireless link with the headset 104. In one or more embodiments, the wireless transceiver 140 may be, for example, a DECT transceiver, Bluetooth transceiver, or IEEE 802.11 (Wi-Fi) transceiver. The antenna 142 converts electric power into radio waves under the control of the wireless transceiver 140, and intercepts radio waves which it converts to electric power and provides to the wireless transceiver 140. Accordingly, by way of the wireless transceiver 140 and the antenna 142, the host device 106 forms a wireless link with the headset 104.

Then network interface 134 allows for communication, using digital and/or analog signals, with one or more other devices over a network. The network may include any private or public communications network, wired or wireless, such as a local area network (LAN), wide area network (WAN), or the Internet. In one or more embodiments, the network interface 134 may provide the host device 106 with connectivity to a cellular network.

As described herein, the memory 136 includes any storage device capable of storing information temporarily or permanently. The memory 136 may include volatile and/or non-volatile memory, and may include more than one type of memory. For example, the memory 136 may include one or more of SDRAM, ROM, and flash memory. In one or more embodiments, the memory 136 may store pairing information for connecting with the headset 104, user preferences, and/or an operating system (OS) of the host device 106.

As depicted in FIG. 1B, the memory 136 stores system data 138 and user data 139. In one or more embodiments, the system data 138 may include settings of the host device 106, an operating system of the host device 106, etc. In one or more embodiments, the user data 139 may include contacts, electronic messages (e.g., emails, text messages, etc.), voicemails, financial data, etc. of a user. In one or more embodiments, the system data 138 and/or the user data 139 may include applications executable by the hardware processor 132, such as a telephony application, calendar application, email application, text messaging application, a banking application, etc.

FIG. 1C depicts a headset 104, according to one or more embodiments. Although the elements of the headset 104 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1C may be omitted, repeated, and/or substituted. Accordingly, various embodiments may lack one or more of the features shown. For this reason, embodiments of the invention should not be considered limited to the specific arrangements of elements shown in FIG. 1C.

As shown in FIG. 1C, the headset 104 includes a hardware processor 112 operably coupled to a memory 116, a wireless transceiver 124 and accompanying antenna 126, a speaker 122, and a microphone 120. In one or more embodiments, the hardware processor 112, the memory 116, the wireless transceiver 124, the microphone 120, and the speaker 122 may remain in communication over one or more communication busses. Although not depicted in FIG. 1C for purposes of simplicity and clarity, it is understood that, in one or more embodiments, the headset 104 may include one or more of a display, a haptic device, and a user-operable control (e.g., a button, slide switch, capacitive sensor, touch screen, etc.).

As described herein, the hardware processor 112 processes data, including the execution of applications stored in the memory 116. In particular, and as described below, the hardware processor 112 executes applications for performing keyword matching and voiceprint matching operations on the speech of a user, received as input via the microphone 120. Moreover, in response to the successful authentication of a user by way of the keyword matching and voiceprint matching operations, the processor may retrieve and present data in accordance with various commands from the user. Data presentation may occur using, for example, the speaker 122. In one or more embodiments, the hardware processor 112 is a high performance, highly integrated, and highly flexible system-on-chip (SOC), including signal processing functionality such as echo cancellation/reduction and gain control in another example. In one or more embodiments, the hardware processor 112 may include a variety of processors (e.g., digital signal processors, etc.), analog-to-digital converters, digital-to-analog converters, etc., with conventional CPUs being applicable.

The headset 104 utilizes the wireless transceiver 124 for transmitting and receiving information over a wireless link with the host device 106. In one or more embodiments, the wireless transceiver 124 may be, for example, a DECT transceiver, Bluetooth transceiver, or IEEE 802.11 (Wi-Fi) transceiver. The antenna 126 converts electric power into radio waves under the control of the wireless transceiver 124, and intercepts radio waves which it converts to electric power and provides to the wireless transceiver 124. Accordingly, by way of the wireless transceiver 124 and the antenna 126, the headset 104 forms a wireless link with the host device 106.

As described herein, the memory 116 includes any storage device capable of storing information temporarily or permanently. The memory 116 may include volatile and/or non-volatile memory, and may include more than one type of memory. For example, the memory 116 may include one or more of SDRAM, ROM, and flash memory. In one or more embodiments, the memory 116 may store pairing information for connecting with the host device 106, user preferences, and/or an operating system (OS) of the headset 104.

As depicted in FIG. 1B, the memory 116 stores an utterance analyzer 117 and voiceprint comparator 118, both of which are applications that may be executed by the hardware processor 112 for performing enhanced voiceprint authentication. The utterance analyzer 117 includes any speech recognition application that is operable to receive as input words spoken by a user, via the microphone 120, and recognize the occurrence of one or more pre-determined keywords within the input. In one or more embodiments, the utterance analyzer 117 may include a statistical model, a waveform-analyzer, and/or an application that performs speech-to-text processing on the utterances of a user. Accordingly, the utterance analyzer 117 analyzes a content of a user's speech against one or more keywords in order to identify a match therebetween.

The voiceprint comparator 118 includes any voice recognition application that is operable to receive as input all or a portion of an utterance spoken by a user, and utilize that input to authenticate, or otherwise confirm the identity of, the user. In one or more embodiments, the voiceprint comparator 118 may rely on one or more previously stored voiceprints. Each of the voiceprints may be associated with a different keyword, as described below. Accordingly, the voiceprint comparator 118 may compare a measureable property of an utterance with a voiceprint, such as a reference model, plot, or function, to authenticate a user.

In one or more embodiments, both the utterance analyzer 117 and the voiceprint comparator 118 rely on the contents of a command library 119. In particular, and as described below, the command library 119 may include a number of associations, where each association groups, or otherwise links, a keyword, a voiceprint, and a resource.

In one or more embodiments, the utterance analyzer 117 may provide the headset 104 with a command system that is always enabled. In other words, all speech of a user 102 that has donned the headset 104 may be monitored and analyzed for an utterance that can be matched with a command in the command library 119. As described herein, a command includes a keyword that may be used to access a resource on the headset 104 or the host device 106. Accessing a resource may include, for example, retrieving data, calling a function or routine, or surfacing an event. Examples of events that may be surfaced include opening a file, creating a voice memo, or interacting with an interactive voice assistant. Accordingly, by way of various commands, the user 102 may control the headset 104 and/or the host device 106. Furthermore, each of the commands may include a different corresponding voiceprint. In this way, any command may be used to concurrently wake up the headset 104, authenticate the user 102, and access a resource. In one or more embodiments, the contents of the system data 138 and the user data 139 may be accessible to a user of the headset 104 by way of one or more voice commands. For example, a user of the headset 104 may speak a command that causes the access of an electronic message, bank balance, or contact stored in the memory 136 of the host device 106.

Figure 2:
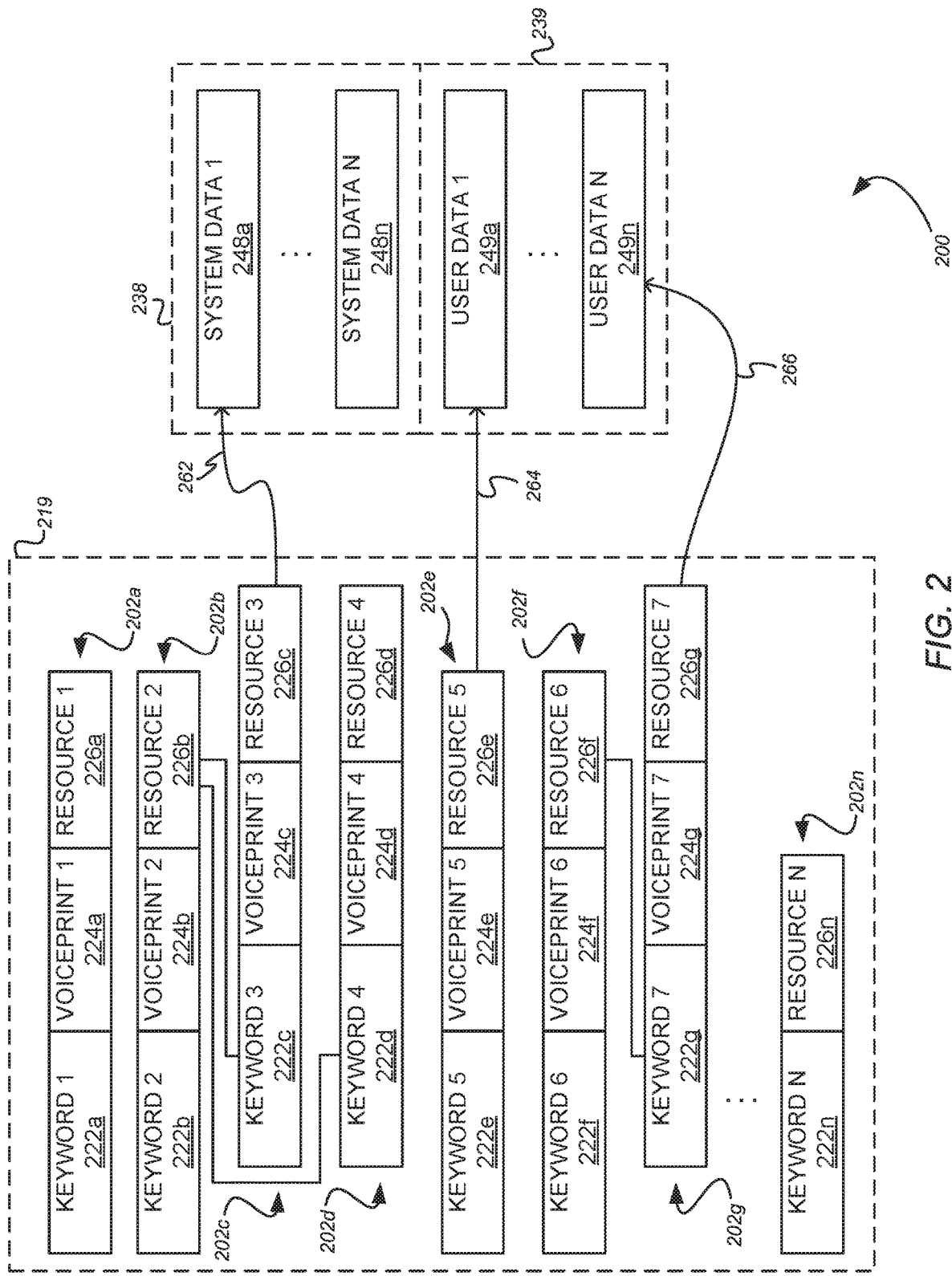
FIG. 2 depicts a system for enhanced voiceprint authentication, in accordance with one or more embodiments of the invention.

FIG. 2 depicts a block diagram of a system 200 for enhanced voiceprint authentication, according to one or more embodiments. Although the elements of the system 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2 may be omitted, repeated, and/or substituted. Accordingly, various embodiments may lack one or more of the features shown. For this reason, embodiments of the invention should not be considered limited to the specific arrangements of elements shown in FIG. 2.

As shown in FIG. 2, the system 200 includes a command library 219, which may be substantially identical to the system library 119, described in reference to FIG. 1C, above. Accordingly, the command library 219 may reside in the memory of a headset device, such as the headset 104 of FIG. 1A. Also, the system 200 includes system data 238 and user data 239, which may be substantially identical to the system data 138 and user data 139, respectively, described in reference to FIG. 1B, above. Accordingly, the system data 238 and user data 239 may reside in the memory of a host device, such as, for example, a smartphone, tablet computer, laptop computer, desktop computer, etc.

Still referring to FIG. 2, the command library 219 is depicted to include a plurality of commands 202. More specifically, the command library 219 is depicted to include commands 202a-202n. As described herein, each command 202 includes at least a keyword 222 associated with a resource 226. Also, a command 202 may include a voiceprint 224 that is associated with the keyword 222. Accordingly, a command 202 may include a keyword 222, a voiceprint 224, and a resource 226. For example, a first command 202a includes a first keyword 222a, a first voiceprint 224a associated with the first keyword 222a, and a first resource 226a associated with the first keyword 222a; and a second command 202b includes a second keyword 222b, a second voiceprint 224b associated with the second keyword 222b, and a second resource 226b associated with the second keyword 222b.

As described herein, each keyword 222 includes a word or phrase used to access an associated resource 226. In one or more embodiments, the utterances of a user, as picked up by a microphone, may be continuously compared to the keywords 222 of the command library 219. In other words, each keyword 222 may comprise a portion of a vocabulary that is recognized by a speech recognition application, such as the utterance analyzer 117, described in reference to FIG. 1C, above. A keyword 222 may include a fixed trigger. Examples of keywords include "play," "pause," "stop," "next track," "redial," "call home," "unlock my phone," "answer," "ignore," "yes," "no," etc.

As described herein, each voiceprint 224 includes the result of a prior analysis of a user speaking the phrase or words of the associated keyword 222. For example, a first voiceprint 224a may include the result of a prior analysis of a given user speaking a first keyword 222a; and a second voiceprint 224b may include the result of a prior analysis of the user speaking a second keyword 222b. In one or more embodiments, the analysis includes an analysis of one or more of a frequency, duration, and amplitude of the user's speech. In this way, each voiceprint 224 may comprise a model, function, or plot derived using such analysis. For example, using the exemplary listing of keywords, above, each of the voiceprints 224a-224g may include, respectively, a result of a prior analysis of a user speaking one of the keywords 222 selected from "play," "pause," "stop," "next track," "redial," "call home," "unlock my phone," "answer," "ignore," "yes," "no," etc. Accordingly, each voiceprint 224 identifies elements of a human voice that may be used to uniquely identify the speaker.

As described herein, each resource 226 includes any component of a headset that may be accessed by the headset. In one or more embodiments, a resource 226 may include data, a routine, or a function call. For example, using the exemplary listing of keywords, above, a resource 226 associated with the keyword "play" may include an operation or command, instructing the playback of content, that is sent to a host device when the utterance "play" is recognized within the speech of a user, and the utterance has been compared to an associated voiceprint 224 to successfully authenticate the user. Similarly, a resource 226 associated with the keyword "answer" may include an operation or command, instructing the answering of an incoming phone call, that is sent to a host device when the utterance "answer" is recognized within the speech of a user, and the utterance has been compared to an associated voiceprint 224 to successfully authenticate the user. As yet another example, a resource 226 associated with the keyword "read my unread email messages" may include a call to a mail application on a host device, instructing the host device to list or provide the content of unread email messages. Accordingly accessing a resource 226, may include retrieving data, requesting data, and/or executing an operation.

In one or more embodiments, one or more of the commands 202 in the command library 219 may not include a voiceprint 224. For example, as illustrated in FIG. 2, the nth command 202n includes the nth keyword 222n and the nth resource 226n. In other words, as depicted in FIG. 2, no voiceprint 224 is associated with the nth command 202n. As a result, an utterance containing the nth keyword 222n may not require user authentication as a condition of accessing the resource 226n. In other words, if a given resource 226 is associated with a keyword 222 that is not associated with a voiceprint 224, then, in response to a successful keyword matching analysis of a user's utterance relative to the associated keyword 222, the user may be provided access to the resource 226. As an option, the nth keyword 222n may include a wakeup word, and/or the nth resource 226n may be relatively benign, such as a function that returns the present time or date.

In one or more embodiments, a resource 226 may provide a hierarchical association of the keyword 222 with which it is associated, and one or more additional keywords 222. For example, referring to FIG. 2, the second resource 226b (associated with the first keyword 222b) includes a reference to a third keyword 222c and a fourth keyword 222d. In this way, the resources 226 may be hierarchically organized and accessed as a menu including one or more additional sub-menus. For example, a third resource 226c and a fourth resource 226d may be accessed by way of the second resource 226b. For purposes of simplicity and clarity, the commands 202 of the command library 219 are illustrated to include a single level of sub-menus, however it is contemplated that, in one or more embodiments, the commands 202 of the command library 219 may be organized within a hierarchical structure that includes secondary or tertiary sub-menus.

In one or more embodiments, a resource 226 may include a link that references data or a function on a paired host device. For example, as depicted in FIG. 2, the third resource 226c includes a reference 262 to an instance of system data 248a at a host device. Each instance of system data 248 may include, for example, an application (e.g., an accessibility application, etc.), a function of an operating system, or a device setting. Also, as depicted in FIG. 2, a fifth resource 226e includes a reference 264 to a first instance of user data 249a at a host device, and a seventh resource 226g includes a reference 266 to an nth instance of user data 249n at the host device. Each instance of the user data 249 may include, for example, contact data (e.g., name, telephone number, address, etc.), a message (e.g., an email, a text message, etc.), a voicemail, an application (e.g., a banking application, etc.), or application data of a user (e.g., a bank balance, etc.). Thus, each of the references 262, 264, 266 may include, for example, a function call, web services call, or resource identifier that results in the return of the linked content on a host device.

In one or more embodiments, if a given resource 226 is associated with a keyword 222 that is associated with a voiceprint 224, then, in response to a successful keyword matching analysis of a user's utterance relative to the associated keyword 222, and a successful voiceprint comparison of the utterance relative to the associated voiceprint 224, the associated resource 226 may be accessed. In this way, a user may be provided access to the resource 226, or content to which the resource 226 refers. Accordingly, in such embodiments, if a keyword matching analysis and a voiceprint comparison analysis are both performed successfully for a command 202, then an authentication success event has occurred. However, in such embodiments, if either the keyword matching analysis or the voiceprint comparison analysis fails, then the authentication fails and resource access does not occur.

In one or more embodiments, an authentication success event may be passed to a host device. For example, as a headset storing the command library 219 attempts to access or obtain the first instance of user data 249a identified by the reference 264, the headset may provide an authentication success event. In one or more embodiments, an authentication success event may include the keyword 222 or voiceprint 224 that the authentication success event was generated in response to the analysis of. For example, the headset accessing or obtaining the first instance of user data 249a may include the fifth keyword 222e and/or the fifth voiceprint 224e in an authentication success event.

In one or more embodiments, the result of the analysis of a keyword 222 relative to an utterance may be binary. In other words, the comparison of an utterance to a keyword 222 may either pass (i.e., sufficiently match) or fail. In one or more embodiments, the result of the analysis of a keyword 222 relative to an utterance may include a numeric score, such as, for example, a number between 0 and 1.

In one or more embodiments, the result of the comparison of a voiceprint 224 with an utterance may be binary. In other words, the comparison of an utterance to a voiceprint 224 may either pass (i.e., sufficiently match) or fail. Accordingly, if the comparison fails, no access is provided to a resource 226 that is associated with the keyword 222 with which the voiceprint 224 is associated. In one or more embodiments, the result of the comparison of a voiceprint 224 with an utterance may include a numeric score, such as, for example, a number between 0 and 1.

In one or more embodiments, different voiceprint confidence thresholds may be associated with two or more different voiceprints 224. For example, each voiceprint 224 of the voiceprints 224a-224g in the command library 219 may include its own confidence threshold. A confidence threshold of a voiceprint 224 may include a minimum score attributable to a comparison of the identity between the voiceprint 224 and an utterance of a user. Accordingly, a confidence threshold of a voiceprint 224 may also include a numeric score, such as a number between 0 and 1. In this way, a user may be authenticated relative to a given keyword 222 only when the result of a comparison between the user's speech and an associated voiceprint 224 results in a score that is greater than or equal to a voiceprint confidence threshold of the voiceprint 224.

In one or more embodiments, voiceprint confidence thresholds may be leveraged in a manner that facilitates user access of the commands 202 of the command library 219, while simultaneously increasing device security. For example, and still referring to FIG. 2, consider a situation in which the first voiceprint 224a includes a given voiceprint confidence threshold, and the second voiceprint 224b includes a different voiceprint confidence threshold. Further, the first keyword 222a may include a wakeup word, which must be matched prior to allowing user access to any other commands 202 (i.e., commands 202b-202n) of the command library 219. Accordingly, the first resource 226a may include a reference to all other keywords 222b-222n of the command library 219. In this way, a user utterance must first successfully match the first keyword 222a and the first voiceprint 224a in order for the user to access the commands 202b-202n. In such embodiments, the voiceprint confidence threshold of the first voiceprint 224a, which is associated with the first keyword 222a, may be set greater than the voiceprint confidence threshold of the second voiceprint 224b in order to reduce the number of false awakes of the headset. Similarly, the lower voiceprint confidence threshold for the second keyword 222b may provide a user with quicker performance of commands 202 of the command library 219 (e.g., the commands 202b, 202c, 202d, etc.), once the device is awake and the use has been authenticated once. As another option, in such embodiments, the voiceprint confidence threshold of the first voiceprint 224a, which is associated with the first keyword 222a, may be set less than the voiceprint confidence threshold of the second voiceprint 224b in order to easily awaken the headset. Further, the greater voiceprint confidence threshold for the second keyword 222b may provide an increased level of security when the user attempts to access the remaining commands 202 of the command library 219 (e.g., the commands 202b, 202c, 202d, etc.), which may result in the access of sensitive information on a host device.

In one or more embodiments, inclusion of a minimal confidence threshold for a voiceprint 224 associated with a basic confirmatory (e.g., "yes," "yup," etc.) or negatory (e.g., "no," "nope," etc.) keyword may serve to reduce the number of commands that are otherwise incorrectly detected by relying on keyword matching alone.

In one or more embodiments, results may be accumulated from the comparisons of user utterances with numerous corresponding voiceprints 224. For example, a count of the number of passes (i.e., voiceprint matches) over a time period (e.g., 3 minutes, 5 minutes, 1 hour) may be accumulated. As another example, the numeric scores of the passes, or passes and fails, for voiceprint authentications over a time period may be combined according to a function, such as, for example, an average or weighted average. In such embodiments, the accumulated score may be used to alter the hierarchical relationship or menu structure of the commands 202. For example, once a user has accumulated a sufficient score, the menu structure of the commands 202 in the command library 219 may be modified to provide the user with a more direct route to a command 202 that may otherwise be buried in a menu—i.e., at a second level, third level, fourth level, or beyond. A given command 202 may be buried deep in a menu in order to ensure repeated user authentication prior to access of the resource 226 of the command 202, such as, for example, a banking application. With a sufficiently high accumulated score, such a command 202 may be elevated to the top level of commands 202 in the command library 219. Also, in such embodiments, the accumulated score may be provided in an authentication success event that is passed to a host device. The host device may store the accumulated score, or utilize the accumulated score for restricting or allowing access to a resource stored on the host device. In this way, the host device may be provided with a biometric score that reflects a headset's confidence in a user's identity.

In one or more embodiments, a particular command 202 may be subject to exceedingly stringent access restrictions. In particular, in such embodiments, a voiceprint 224 may include a voiceprint confidence threshold that is associated with an exceedingly high value. For example, the seventh voiceprint 224g of the seventh command 202g may include a voiceprint confidence threshold value of 0.85, 0.90, 0.95, etc. In this example, if a user is authenticated by way of the seventh command 202g, then the menu structure of the commands 202 in the command library 219 may be modified to provide the user with a more direct route to a command 202 that may otherwise be buried in a menu, as described above. Further, in this example, the sixth keyword 222f of the sixth command 202f may include an explicit challenge request phrase, such as, for example "challenge me," that the user may explicitly invoke for accessing the seventh command 202g. The sixth voiceprint 224f may include voiceprint confidence threshold that is substantially lower than the voiceprint confidence threshold of the seventh voiceprint 224g. In this way, a user may consciously and deliberately reduce the effort required to access other commands 202 in the command library 219. The user may do this, for example, before entering a loud environment or in anticipation of saving time. As an option, the challenge request may be initiated at a host device, such as by an application that the user is interacting with.

Figure 3:
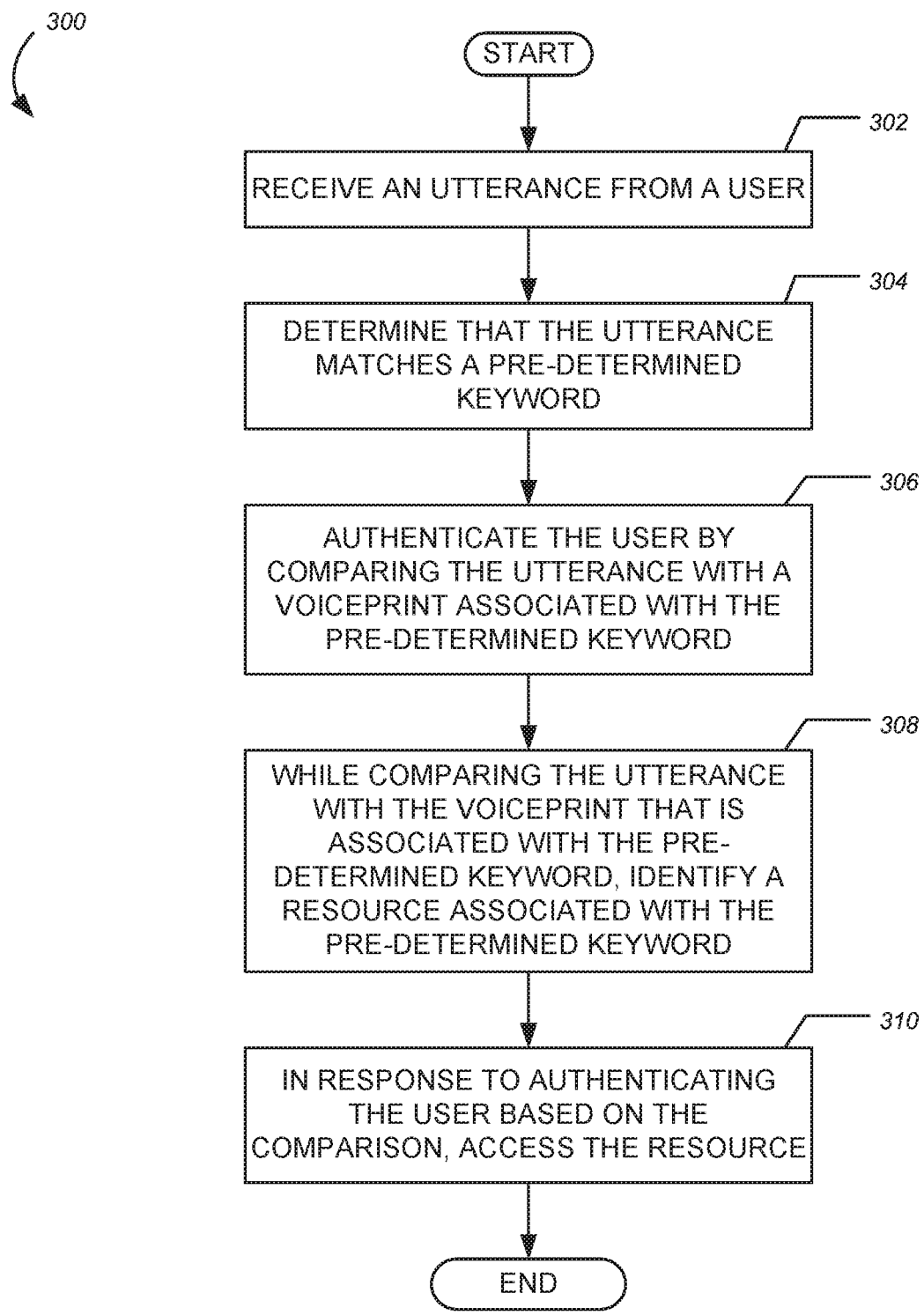
FIG. 3 is a flow diagram showing method for enhanced voiceprint authentication, in accordance with one or more embodiments of the invention.

FIG. 3 shows a flowchart of a method 300 for enhanced voiceprint authentication, in accordance with one or more embodiments of the invention. While the steps of the method 300 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 300 may be carried out by a headset, such as the headset 104, described hereinabove in reference to FIGS. 1A-1C, and the system 200 described in reference to FIG. 2.

At step 302, an utterance is received from a user. In one or more embodiments, the utterance includes any words spoken by a user. Further, the utterance may be received by monitoring a microphone of a headset worn by the user. Thus, the headset may receive the utterance as the user is speaking. In one or more embodiments, the utterance may be analyzed to identify the occurrence of one or more pre-determined keywords within. For example, an utterance analyzer, as described above in reference to FIG. 1C, may identify the occurrence of keywords such as "play," "pause," "unlock," etc. within a user's speech.

At step 304, it is determined that at least a portion of the utterance matches a pre-determined keyword. In one or more embodiments, the pre-determined keyword may be one of a list of predefined words or phrases, such as fixed triggers, each of which is included in a respective command. In one or more embodiments, the pre-determined keyword may be identified by performing speech-to-text processing or waveform matching on the utterance of the user. However, in various embodiments, the pre-determined keyword may be identified in any suitable manner. As an example, if the user speaks the word "play," then a command that includes the keyword "play" may be identified. As another example, if the user speaks the phrase "unlock my phone," then a command that includes the keyword "unlock" may be identified.

At step 306, the user is authenticated by comparing the utterance, or a portion of the utterance, with a voiceprint. Such a comparison may rely on the voiceprint comparator described hereinabove in reference to FIG. 1C. The voiceprint is associated with the pre-determined keyword. In one or more embodiments, the voiceprint may have been previously stored, based on the user speaking the associated keyword. In one or more embodiments, the voiceprint may include a model, function, or plot generated by an analysis of the user speaking the keyword at the prior point in time. Accordingly, the utterance or portion thereof may be transformed by the same analysis, and the result compared with the prior result. Thus, the authentication of the user includes determining, based on an analysis, that the voiceprint matches the utterance of the user. If the comparison identifies a match, then the user that spoke the utterance received at step 302 is authenticated. As described hereinabove, the result of the comparison may be binary (e.g., pass or fail), or may include a numeric confidence score. In such embodiments, a confidence threshold may set a minimum identity between the voiceprint and the utterance in order for a match to occur that authenticates the speaking user. Thus, if the result includes a numeric confidence score, then the numeric confidence score may be compared with a voiceprint confidence threshold of the voiceprint in order to authenticate the user.

Furthermore, at step 308, while comparing the utterance, or portion thereof, with the voiceprint that is associated with the pre-determined keyword, a resource is identified. The resource is associated with the pre-determined keyword. Accordingly, the resource may be identified by virtue of being grouped with or linked to the pre-determined keyword. In one or more embodiments, the resource may include data, a function call, or a routine. Thus, the resource associated with the keyword is located, but is not retrieved, invoked, executed, or called while the user that spoke the keyword is being authenticated. In other words, up to this point, a keyword has been matched to the content of a user's speech, and a resource that the user intended to call has been identified from the keyword, but the resource has not been accessed for the user while the authentication of the user is still pending based on the user's speech.

Also, at step 310, in response to authenticating the user based on the comparison, the resource is accessed. In one or more embodiments, accessing the resource may include any execution, retrieval, or invocation operation that is suitable for the resource. For example, if the resource includes data that is stored on a headset or host device, the data may be retrieved. In such an example, the resource may include a resource identifier (e.g., uniform resource identifier, etc.) that specifically identifies a location from which the data may be obtained. As another example, if the resource includes a routine, then the routine may be executed. Also, if the resource includes a function call, then the function call may invoke a function that returns data. As a more specific example, a called function may reside on a host device, such as a smartphone which, in response to the call, returns information to the headset. The function call may include a web services call.

In one or more embodiments, accessing the resource may include passing an authentication success event to a host device. As an option, the authentication success event passed to the host device may include the pre-determined keyword or an identifier thereof, the voiceprint or an identifier thereof, a confidence score for the authentication, and/or an accumulated confidence score.

Figure 4:
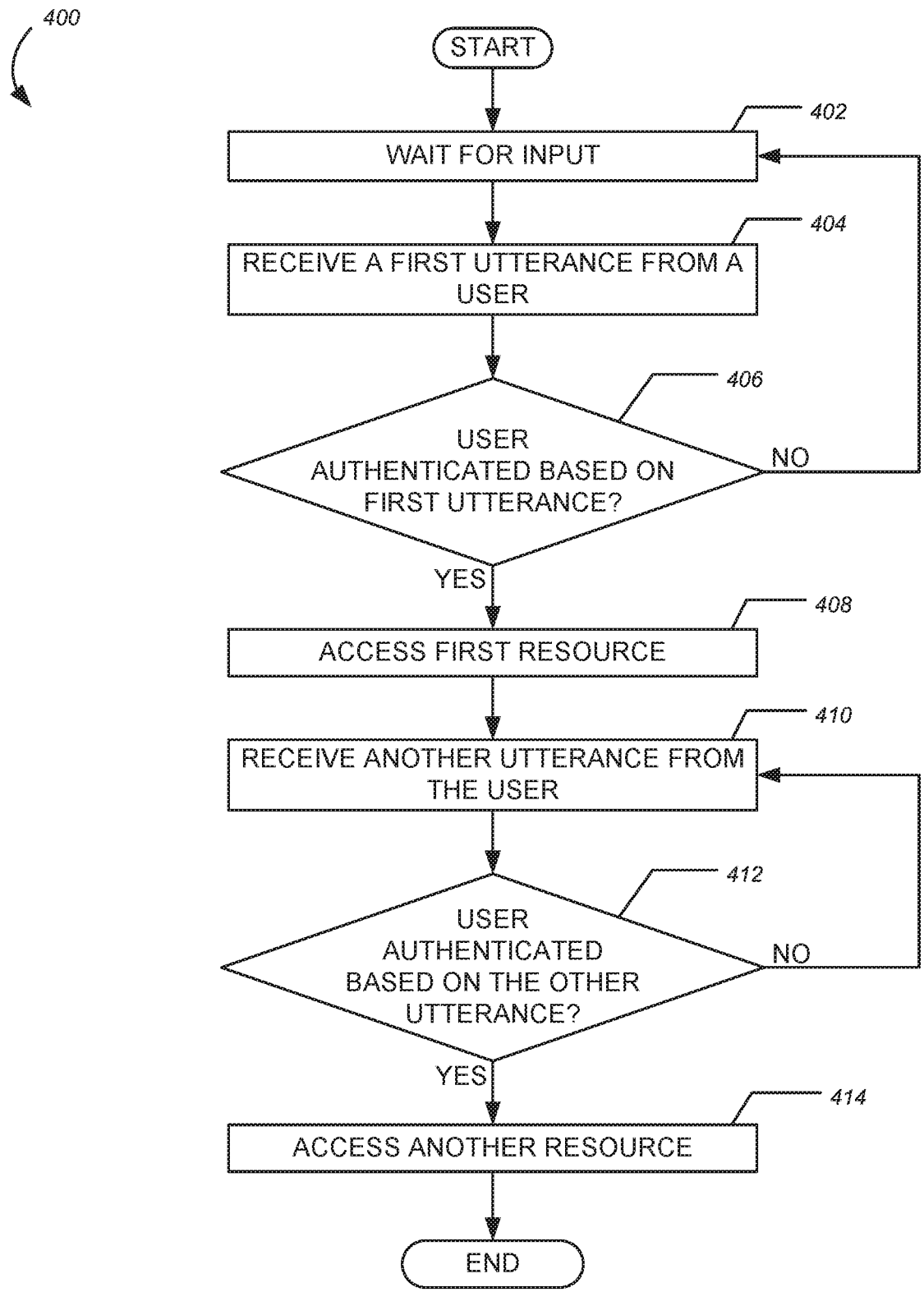
FIG. 4 is a flow diagram showing a method for enhanced voiceprint authentication, in accordance with one or more embodiments of the invention.

FIG. 4 shows a flowchart of a method 400 for enhanced voiceprint authentication, in accordance with one or more embodiments of the invention. While the steps of the method 400 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 400 may be carried out by a headset, such as the headset 104, described hereinabove in reference to FIGS. 1A-1C, and the system 200 described in reference to FIG. 2.

At step 402, a device performing the method 400 waits for input. In one or more embodiments, the input may include the speech of a user, such as a user wearing a headset. Accordingly, at step 402, the headset may wait for a predetermined trigger. At step 404, a first utterance is received from the user. Step 404 may be substantially identical to step 302, described in reference to the method 300 of FIG. 3. Accordingly, the utterance may be received by monitoring a microphone, and analyzed to identify the occurrence of one or more pre-determined keywords within the user's speech.

At step 406, using the first utterance, it is determined whether the user is authenticated. The determination at step 406 may proceed according to the steps 304-308, described in reference to the method 300 of FIG. 3. As an option, in embodiments of step 406 that are outside the scope of step 308 of the method 300, a first resource may be identified before the first utterance is compared with a first voiceprint, or after the user has been authenticated due to the comparison of the first utterance and the first voiceprint. If the user is authenticated based on the first utterance, the first resource is accessed at step 408. Step 408 may be substantially identical to step 310, described in reference to the method 300 of FIG. 3. However, if the user is not authenticated, the first resource is not accessed, and the executing device returns to waiting for another utterance.

Still yet, at step 410, a second utterance is received from the user. Step 410 may be substantially identical to step 302, described in reference to the method 300 of FIG. 3. The utterance received at step 410 may include the same keyword of the utterance received at step 404, or the utterance received at step 410 may include a different keyword than the utterance received at step 404.

Accordingly, at step 412, using the second utterance, it is again determined whether the user is authenticated. The determination at step 412 may proceed according to the steps 304-308, described in reference to the method 300 of FIG. 3. As an option, in embodiments of step 412 that are outside the scope of step 308 of the method 300, a second resource may be identified before the second utterance is compared with a second voiceprint, or after the user has been authenticated due to the comparison of the second utterance and the second voiceprint. If the user is authenticated based on the second utterance, the second resource is accessed at step 414. Step 414 may be substantially identical to step 310, described in reference to the method 300 of FIG. 3. However, if the user is not authenticated, the second resource is not accessed, and the executing device returns to waiting for another utterance.

In one or more embodiments, the first utterance from the user may include a wakeup word. Of course, in other embodiments that do not employ a wakeup word, the first utterance may be matched with any keyword in a command library. In one or more embodiments, the authentication of the user at step 406 may utilize a first voiceprint confidence threshold, and the authentication of the user at step 412 may utilize a second voiceprint confidence threshold. The second voiceprint confidence threshold may be different than (i.e., greater than or less than) the first voiceprint confidence threshold. In this way, each of the commands accessed, at steps 406 and 412, respectively, due to the speech of the user may be associated with a different level of security. As noted above, such a configuration may be used to facilitate a user waking of a headset, to facilitate user access to commands, to increase device security, or to reduce the number of false awakes of a headset.

In one or more embodiments, the authentication of the user at step 406 may generate a first numeric score. Also, the authentication of the user at step 412 may generate a second numeric score. Each of these scores may be compared to the respective voiceprint confidence thresholds, described above. Still yet, the scores may be accumulated. Thereafter, an accumulated score may result in a reorganization of the structure of a command library. Also, any of the scores may be provided to a host device at any time. For example, if the access at step 414 is directed to data on a host device, then the second numeric score and/or an accumulated score may be provided to a host device with an authentication success event during the access of the second resource at step 414.

Figure 5:
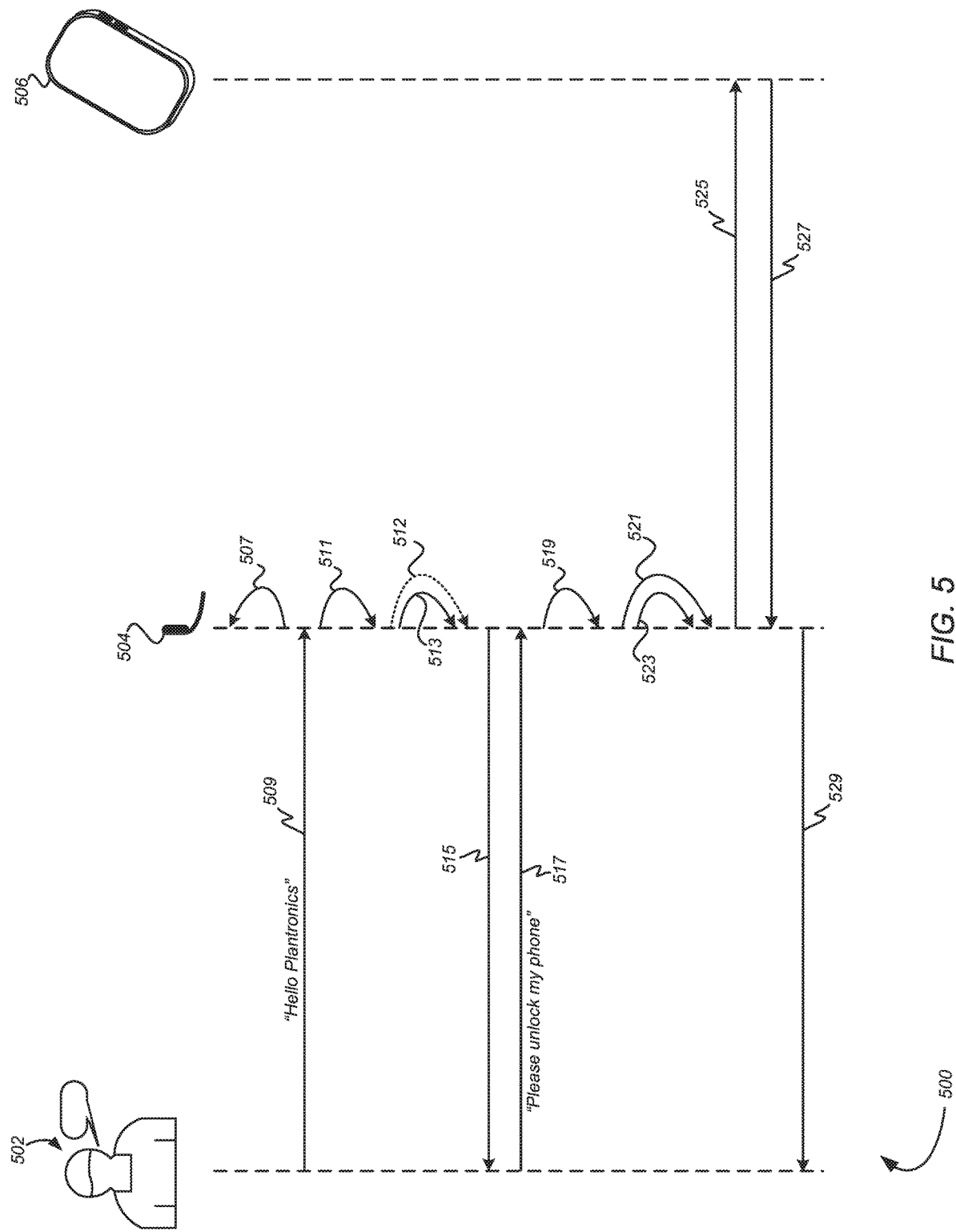
FIG. 5 is a communication diagram depicting an example of enhanced voiceprint authentication, in accordance with one or more embodiments of the invention.

Referring to FIG. 5, a communication flow 500 is shown in accordance with one or more embodiments of the invention. The communication flow 500 illustrates an example of an interaction of a user 502, a host device 506, and a headset 504 implementing enhanced voiceprint authentication.

As shown in FIG. 5, the headset 504 waits, at operation 507, for an utterance from the user 502. As long as the user 502 is not speaking, the headset 504 may remain in a waiting state. At operation 509, the user 502 speaks, which is detected by a microphone of the headset 504. In particular, the user has said "Hello Plantronics." The headset 504 determines, at operation 511, that at least a portion of the user's speech matches a pre-determined keyword. In particular, the headset 504 is storing a command that includes "hello Plantronics" as a keyword. The matching keyword is associated with a resource on the headset 504, and may be associated with a voiceprint.

If the matching keyword is not associated with a voiceprint, then, at operation 513, the resource is accessed. The resource may include a function that prompts the user 502, asking the user 502 to say another command. Accordingly, at operation 515, by way of a speaker in the headset 504, the user 502 is prompted to say another command. For example, the user 502 may hear the words "say a command," or "headset ready."

However, if the keyword "hello Plantronics" is associated with a voiceprint, then, the resource is not accessed without first authenticating the user. For example, the resource on the headset 504 may be associated with a voiceprint of the user 502 speaking "hello Plantronics" at a prior time. Thus, before the user 502 is prompted to say another command, the voice of the user 502 is authenticated, at operation 512, using this voiceprint. As an option, the utterance received at operation 509 may include a wakeup word used to wake the headset 504.

Next, at operation 517, the user speaks the phrase "please unlock my phone." Again, the headset 504 determines, at operation 519, that the words "unlock my phone" within the user's speech match a pre-determined keyword within another command stored on the headset 504. The "unlock my phone" keyword on the headset 504 is associated with both a resource on the headset 504, and a voiceprint on the headset 504. At operation 521, the user 502 is authenticated by comparing the user's utterance of "unlock my phone" with the voiceprint on the headset 504. Moreover, at operation 523, which may occur while the user 502 is being authenticated, a resource associated with the "unlock my phone" keyword is identified. The identified resource includes a call to unlock the host device 506 of the user. Accordingly, once the user authentication of operation 521 completes, the headset 504 accesses the resource. Accessing the resource includes sending, at operation 525, a call to unlock the host device 506. The call to unlock the host device 506 may include an authentication success event, which indicates that the headset 504 has verified the identity of the user 502.

As an option, the headset 504 and the user 502 may be notified of the unlock. For example, as shown in FIG. 5, at operation 527 the host device 506 notifies the headset 504 that the host device 506 has been unlocked. Further, in response to this notification, the headset 504 notifies the user 502, at operation 529, that the host device 506 has been successfully unlocked. Thus, in response to the notification at operation 527 from the host device 506, the user may experience a vibratory alert, or an auditory signal that confirms the unlock.

As described above, the user 502 may continue to access commands of the headset 504 by speaking keywords. Further, each time the headset 504 detects a keyword within the speech of the user 502, the headset 504 may compare the relevant utterance to a previously stored voiceprint. In this way, the headset 504 may authenticate the user 502 in response to each command spoken by the user 502. Due to the continuous and recurring authentication of the user 502 by the headset 504, the headset 504 can maintain a greater confidence in the identity of the user 502. In this way, the security of the headset 504 may be dramatically improved relative to prior art devices, without negatively impacting the experience of the user 502, and the headset 504 may become a token that can reliably confirm the identity of the user 502 in communications to the host device 506.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A method, comprising:
   receiving a first utterance from a user;
   independent from an authenticating the user, identifying a first pre-determined keyword that matches at least a portion of the first utterance;
   based on the identification of the first pre-determined keyword, authenticating the user by comparing the at least a portion of the first utterance with a first voiceprint that is associated with the first pre-determined keyword;
   while comparing the at least a portion of the first utterance with the first voiceprint that is associated with the first pre-determined keyword:
      identifying a first resource associated with the first pre-determined keyword; and
   in response to authenticating the user based on the comparison, accessing the first resource.

2. The method of claim 1, wherein the user is authenticated in response to determining that the at least a portion of the first utterance matches the first pre-determined keyword.

3. The method of claim 2, wherein accessing the first resource includes calling a function on a host device.

4. The method of claim 2, wherein accessing the first resource includes sending an authentication success event to a host device.

5. The method of claim 1, comprising:
   receiving a second utterance from the user;
   determining that at least a portion of the second utterance matches a second pre-determined keyword;

authenticating the user by comparing the at least a portion of the second utterance with a second voiceprint that is associated with the second pre-determined keyword;

while comparing the at least a portion of the second utterance with the second voiceprint that is associated with the second pre-determined keyword:

identifying a second resource associated with the second pre-determined keyword; and in response to authenticating the user based on the comparison of the at least a portion of the second utterance and the second voiceprint, accessing the second resource.

6. The method of claim 5, wherein the first voiceprint is associated with a first voiceprint confidence threshold.

7. The method of claim 6, wherein the second voiceprint is associated with a second voiceprint confidence threshold.

8. The method of claim 7, wherein the first voiceprint confidence threshold is greater than the second voiceprint confidence threshold.

9. The method of claim 7, wherein the first voiceprint confidence threshold is less than the second voiceprint confidence threshold.

10. The method of claim 5, wherein the first pre-determined keyword includes a wakeup word.

11. A headset, comprising:
a microphone;
a speaker;
at least one processor; and
memory coupled to the at least one processor, the memory having stored therein a first voiceprint, a first pre-determined keyword in association with the first voiceprint, and instructions which when executed by the at least one processor, cause the at least one processor to perform a process including:
receiving, via the microphone, a first utterance from a user,
independent from an authenticating the user, identifying a first pre-determined keyword that matches at least a portion of the first utterance,
based on the identification of the first pre-determined keyword, authenticating the user by comparing the at least a portion of the first utterance with the first voiceprint,
while comparing the at least a portion of the first utterance with the first voiceprint, identifying a first resource associated with the first pre-determined keyword, and
in response to authenticating the user based on the comparison, accessing the first resource.

12. The headset of claim 11, wherein the first voiceprint includes at least one of a previously stored model, plot, and function.

13. The headset of claim 11, wherein the instructions, when executed by the at least one processor, cause the at least one processor to perform the process including:
receiving a second utterance from the user,
determining that at least a portion of the second utterance matches a second pre-determined keyword,
authenticating the user by comparing the at least a portion of the second utterance with a second voiceprint that is associated with the second pre-determined keyword,
while comparing the at least a portion of the second utterance with the second voiceprint that is associated with the second pre-determined keyword:
identifying a second resource associated with the second pre-determined keyword, and
in response to authenticating the user based on the comparison of the at least a portion of the second utterance and the second voiceprint, accessing the second resource.

14. The headset of claim 13, wherein the first voiceprint is associated with a first voiceprint confidence threshold.

15. The headset of claim 14, wherein the second voiceprint is associated with a second voiceprint confidence threshold.

16. The headset of claim 15, wherein the first voiceprint confidence threshold is greater than the second voiceprint confidence threshold.

17. The headset of claim 15, wherein the first voiceprint confidence threshold is less than the second voiceprint confidence threshold.

18. The headset of claim 13, wherein accessing the second resource includes sending an authentication success event to a host device.

* * * * *